US012686154B2

(12) United States Patent
Groppo et al.

(10) Patent No.: US 12,686,154 B2
(45) Date of Patent: Jul. 21, 2026

(54) METHOD FOR RECYCLING END-OF-LIFE SOLAR PANELS

(71) Applicant: University of Kentucky Research Foundation, Lexington, KY (US)

(72) Inventors: John G. Groppo, Nicholasville, KY (US); Zebulon Hart, Owingsville, KY (US); Lucas Bertucci, Louisville, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 122 days.

(21) Appl. No.: 18/669,897

(22) Filed: May 21, 2024

(65) Prior Publication Data

US 2024/0391139 A1      Nov. 28, 2024

Related U.S. Application Data

(60) Provisional application No. 63/468,951, filed on May 25, 2023.

(51) Int. Cl.
| | |
|---|---|
| *B29B 17/02* | (2006.01) |
| *B29K 105/26* | (2006.01) |
| *B29L 31/34* | (2006.01) |

(52) U.S. Cl.
CPC ...... *B29B 17/02* (2013.01); *B29B 2017/0265* (2013.01); *B29K 2105/26* (2013.01); *B29L 2031/3406* (2013.01)

(58) Field of Classification Search
CPC ................ B29B 17/02; B29B 17/0412; B29B 2017/0203; B29B 2017/0224; B29B 2017/0255; B29B 2017/0265; B29B 2017/0293; B29L 2031/3406; B29K 2105/26
See application file for complete search history.

(56) References Cited

U.S. PATENT DOCUMENTS

2024/0391139 A1* 11/2024 Groppo ................... B29B 17/02

* cited by examiner

*Primary Examiner* — Sonya M Sengupta
(74) *Attorney, Agent, or Firm* — Stites & Harbison PLLC; Warren D. Schickli

(57) ABSTRACT

A method of recycling a solar panel includes steps of removing a frame from the solar panel, delaminating a glass cover, silicon wafers and a plastic backing of the solar panel using a green solvent adapted to weaken, rather than dissolve, an adhesive used in lamination of the solar panel thereby generating a delaminated material stream, separating glass of the glass cover from the delaminated material stream, separating the plastic backing from the delaminated material stream thereby generating a concentrated metals stream, electrostatically separating insulator materials and electrically conducting materials from the concentrated metals stream thereby creating an insulator material stream and an electrically conducting material stream and separating silicon from other metals in the electrically conducting material stream.

18 Claims, 3 Drawing Sheets

SP

F

C

EVA

SC

EVA

B

METHOD FOR RECYCLING END-OF-LIFE SOLAR PANELS

RELATED APPLICATIONS

This document claims priority to U.S. Provisional Patent Application Ser. No. 63/468,951, filed on May 25, 2023, which is hereby incorporated by reference.

TECHNICAL FIELD

This document relates generally to the recycling field and, more particularly, to the recycling of solar panels and the recovery of recyclable aluminum, glass, silicon, insulating materials and other electrically conducting metals.

BACKGROUND

End-of-life solar panels present a unique challenge to sustainable waste management. Ever increasing volumes are discarded annually, with few options available for recycling. IRENA estimates that by 2030, the cumulative value of recoverable raw materials from end-of-life panels will be $450 million, equivalent to the raw materials currently needed to produce 60 million new panels. The challenge is that these solar panels contain large volumes of waste with very low contained value, exacerbated by the presence of potentially hazardous elements such as lead (Pb), cadmium (Cd) and arsenic (As).

This technology focuses on developing a sustainable alternative to landfilling by physically separating components prior to selective recovery of contained metal values, an approach analogous to metal recovery from complex low-grade ores. By doing so, essentially all of the valuable metals (e.g. >85% of silver (Ag) and >99% copper (Cu)) along with the hazardous metals (e.g. >99% of Pb) are concentrated into a single product representing <3% of the overall mass as shown in FIG. 1. This technology significantly simplifies subsequent recovery of metals by concentrating them into a considerably enriched product, while greatly reducing the mass to be treated. Simultaneously, the glass cover, representing 75% of the panel mass, is recovered as a separate high quality glass cullet suitable for recycling.

SUMMARY

In accordance with the purposes and benefits set forth herein, a new and improved method of recycling a solar panel, comprises, consists of or consists essentially of: (a) removing a frame from the solar panel, (b) delaminating a glass cover, silicon wafers and a plastic backing of the solar panel using a green solvent adapted to weaken, rather than dissolve, an adhesive used in lamination of the solar panel thereby generating a delaminated material stream, (c) separating glass of the glass cover from the delaminated material stream, (d) separating the plastic backing from the delaminated material stream thereby generating a concentrated metals stream, (e) electrostatically separating insulator materials and electrically conducting materials from the concentrated metals stream thereby creating an insulator material stream and an electrically conducting material stream, and (f) separating silicon from other metals in the electrically conducting material stream.

In at least some embodiments, the method further includes recycling the frame. In at least some embodiments, the method further includes recycling the glass. In at least some embodiments, the method further includes subjecting the solar panel to shredding following the removal of the frame and prior to the delaminating.

In some of the many possible embodiments of the method, the separating of the glass is by screening the glass from the delaminated material stream. Some embodiments may include further shredding the delaminated material stream following the separating of the glass. In at least some embodiments, the separating of the plastic backing may be done by screening.

The method may further include recovering copper from the electrically conducting material stream. The method may further include recovering silver from the electrically conducting material stream.

In accordance with an additional aspect, a method of recycling a solar panel comprises, consists of or consists essentially of: (a) delaminating a glass cover, silicon wafers and a plastic backing of the solar panel using a green solvent adapted to weaken, without fully dissolving, an adhesive used in lamination of the solar panel thereby generating a delaminated material stream, (b) separating glass of the glass cover from the delaminated material stream, and (c) separating the plastic backing from the delaminated material stream thereby generating a concentrated metals stream.

The method may further include substantially avoiding (1) coating of metal-containing particles in the delaminated material stream, and (2) masking of conductive properties of the metal containing particles with fully dissolved adhesive. The method may further include electrostatically separating insulator materials and electrically conducting materials from the concentrated metals stream thereby creating an insulator material stream and an electrically conducting material stream.

The method may further include recovering silicon from the other metals in the electrically conducting material stream. The method may further include recovering silver and copper from the electrically conducting material stream.

In accordance with yet another aspect, a method of recycling a solar panel, comprises, consists of or consists essentially of: (a) diffusing a solvent into a polymer adhesive used in lamination of the solar panel to expand the polymer adhesive and thereby generate a delaminated material stream without fully dissolving the polymer adhesive, (b) separating glass from the delaminated material stream, and (c) separating the plastic backing from the delaminated material stream thereby generating a concentrated metals stream.

The method may further include electrostatically separating insulator materials and electrically conducting materials from the concentrated metals stream thereby creating an insulator material stream and an electrically conducting material stream. The method may further include recovering silicon from the other metals in the electrically conducting material stream. The method may further include recovering silver and copper from the electrically conducting material stream.

In the following description, there are shown and described several different embodiments of the new and improved method of recycling solar panels. As it should be realized, the method is capable of other, different embodiments and its several details are capable of modification in various, obvious aspects all without departing from the method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate certain aspects of the method and together with the description serve to explain certain principles thereof. A person of ordinary skill in the art will readily recognize from the following discussion that alternative embodiments of the method may be employed without departing from the principles described below.

Reference will now be made in detail to the present preferred embodiments of the apparatus and method.

DETAILED DESCRIPTION

Figure 1:
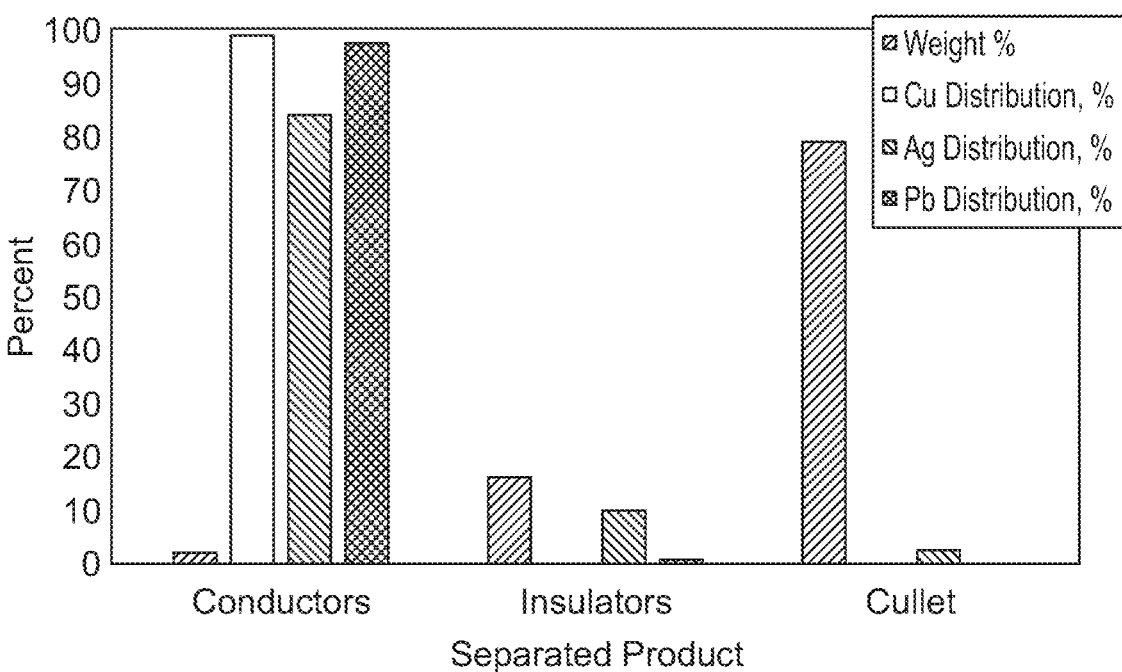
FIG. 1 is a bar graph illustrating the distribution of weight and metals into separated solar panel products.
Figure 2:
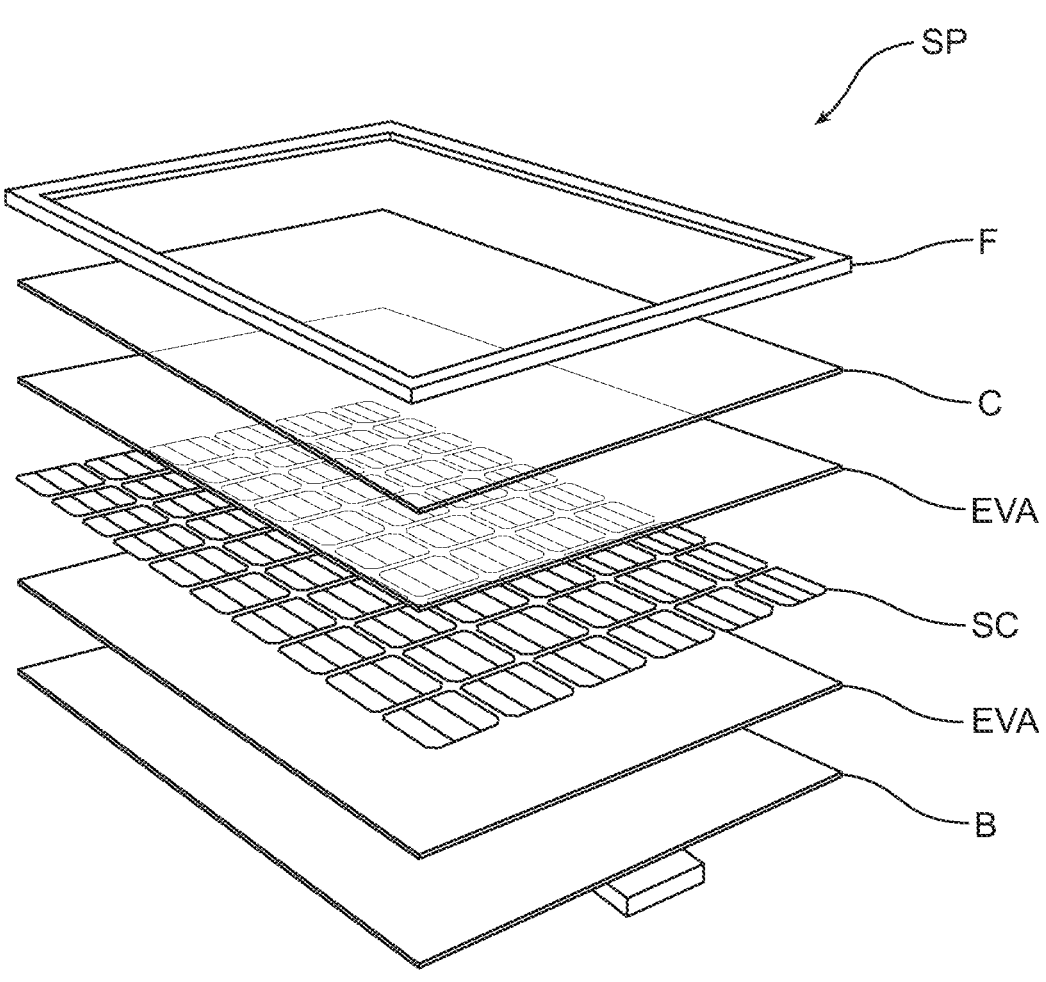
FIG. 2 is an exploded perspective view of a silicon based solar cell.

As illustrated in FIG. 2, a solar panel SP is comprised of several layers, each differing in composition and function. The photoactive layer of common mono and polycrystalline solar cells SC consists of doped silicon crystals, embedded with a series of conductors and conducting busbars that collect and distribute the current produced by the photovoltaic effect within the silicon, which transmit the energy to jumper cables, that exit the solar array. Most commonly, these conductors are composed primarily of copper, with lead-tin solder forming mechanical connections.

The solar cells SC themselves are sandwiched between a front cover C and backing B. The front cover C is usually a plate of tempered glass attached to the cells with an adhesive polymer sheet, the most common composition being ethylene vinyl acetate (EVA) due to its transparency and longevity when exposed to UV radiation for the 20+ year service life experienced by most solar cells. The backing material B is adhered, again typically with EVA, and can vary widely in composition. Many less expensive models use polyethylene terephthalate (PET) and polypropylene (PP), while premium backing materials are typically a form of polyvinyl fluoride (PVF). An aluminum frame F commonly provides rigidity to the completed solar array, and allows the array to be affixed, as a panel, to securing anchors.

Figure 3:
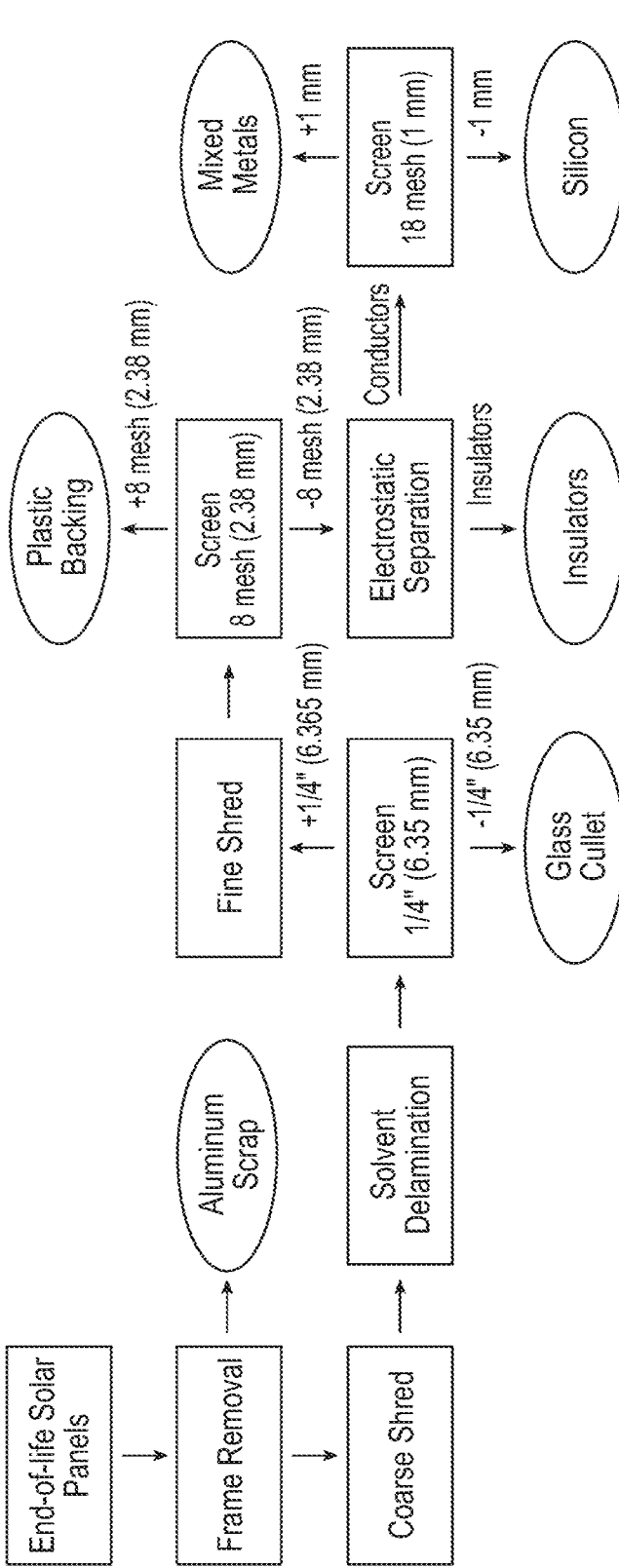
FIG. 3 is a schematic block diagram of the new and improved method for the recycling of solar panels.

As illustrated in FIG. 3, the new and improved method of recycling a solar panel may be described as including the steps of: (a) removing a frame from the solar panel, (b) subjecting the frameless solar panel to a coarse shred (i.e. cutting the solar panel into pieces of manageable size such as 5 cm wide strips), (c) delaminating a glass cover, silicon wafers and a plastic backing of the solar panel using a green solvent adapted to weaken, rather than dissolve, an adhesive used in lamination of the solar panel thereby generating a delaminated material stream, (d) separating glass of the glass cover from the delaminated material stream, (e) subjecting the remaining material to a fine shred to reduce the size of the insulators and mixed metals to less than 2.38 mm, (f) separating the plastic backing from the delaminated material stream thereby generating a concentrated metals stream, (g) electrostatically separating insulator materials and electrically conducting materials from the concentrated metals stream thereby creating an insulator material stream and an electrically conducting material stream and (h) separating silicon from other metals in the electrically conducting material stream.

The frame F, typically made from aluminum, is pressed around the edges of the solar panel SP and sealed with a watertight gasket or caulk. As such it may be mechanically removed.

The proposed approach for delaminating the glass cover C, the silicon wafers or cells SC and a plastic backing B of the solar panel SP differs from the prior art in several ways.

a. The proposed approach uses "green-solvents". For purposes of this document, "green solvents" refers to solvents that are inherently safer for both operator health and the environment minimizing the potential for harmful and hazardous impact. Specific solvents/compounds include ethyl acetate, acetic acid, toluene and d-limonine which is derived from citrus. These solvents offer significant sustainability advantages over others, such as dichloromethane (DCM), used in the prior art.

b. The proposed approach uses a solvent delamination step to weaken the adhesive EVA bond rather than dissolving it. By weakening the adhesive bond, glass can be effectively dislodged as coarse fragments with mechanical agitation (stirring, tumbling, shaking or using ultrasonics), leaving the solar cell and imbedded conductive traces intact. A key advantage to this approach is that clean glass fragments can be readily recovered as ASTM D5359 grade glass cullet by sieving at 0.25 inches (6.35 mm). Fragments finer than 0.25 inches are primarily clean glass, while the >0.25 inch size fraction consists primarily of the silicon solar cells and embedded conductors adhered to a plastic backing. Solvent effectiveness is improved with mild heat (i.e., 70° C.).

c. An important aspect to this approach is that the EVA adhesive layer is weakened, not completely dissolved. Dissolving the EVA can create downstream separation problems as soluble EVA can coat metal-containing particles, masking conductive properties and making selective separation difficult, as described below.

d. The recovered glass comprises nearly 80% of the mass of the solar panel. By effectively removing the glass, the remaining 20% consists of a sheet that contains essentially all the potentially valuable metals (i.e., Cu, Ag and Si) as well as all the potentially hazardous metals (i.e., Pb).

As further explanation, the dissolving of a polymer, such as EVA, requires a few stages. First, is swelling the polymer. This is where the solvent diffuses into the polymer and expands it into a gel like swollen rubber. Second, the polymer reaches a "critical" concentration of solvent that has diffused into it. Third, a "dissolution clock" begins but only once the critical concentration is reached and not a moment before. During this time, the molecular chains of the polymer are being untangled. After the "dissolution clock" ends, the fourth step begins and the untangled chains are actually dissolved into the solvent. These steps are repeated for each layer of the polymer until the solvent has fully diffused through and the polymer has completely dissolved. To recap the steps: 1) Swelling 2) Critical Concentration 3) Waiting time 4) Dissolved. The green solvents used in the present method weaken the adhesive EVA bond by diffusing into the EVA and swelling it. "Weakening the adhesive bond" as used above, refers to the green solvent diffusing into the polymer (EVA) and expanding it into a gel like swollen rubber. The green solvents do not reach a critical concentration and start the dissolution clock.

By removing most of the glass, the volume of the remaining components is significantly reduced, offering simplified selective concentration of metals. This is a significant advantage over prior art approaches which essentially shred the entire solar panel, resulting in a substantial volume of fine glass particles making any subsequent physical separation difficult and inefficient.

The remaining sheet containing the solar cells, conductive traces and plastic backing is shredded to liberate metal components and separated at 2.38 mm (8 mesh). Material >2.38 mm is predominantly plastic backing B of the solar cell, most commonly comprised of polyethylene terephthalate (PET) and polypropylene (PP) which are durable and largely resistant to shredding. The less than 2.38 mm (8 mesh) fraction consists of softer plastics and EVA, liberated metal components and minor amount of fine glass. These are readily separated by electrostatic separation, a technique based on the conductivity of the components.

More specifically, electrostatic separation is a commercially available process where all particles are charged and then fed onto a grounded rotating drum or cylinder. Particles with conducting properties will conduct their charge to the grounded drum/cylinder and be thrown from the rotating drum/cylinder. In contrast, particles with insulating properties will retain their charge and be pinned to the drum/cylinder for subsequent removal by brush or scraper. This approach concentrates essentially all the metal value into a single product stream (i.e., conductors) while concentrating all the remaining plastics and glass into another product stream (i.e. insulators). The effectiveness of electrostatic separation of metals is significantly enhanced because a substantial volume of glass particles have been removed prior to this step, reducing entrainment.

The concentrated metals can be further separated simply by sieving at a size between 0.5 mm to 1 mm (35 mesh and 18 mesh).

a. The >1 mm size fraction contains the conductive traces and is comprised essentially of copper and lesser amounts of tin (Sn) and lead (Pb), derived from solder connections.

b. The <1 mm size fraction contains the silicon metal (Si) and silver (Ag) derived from the silicon PV cells. The silicon may be separated from the silver by further screening as it is more brittle than the silver and is generally finer after shredding.

c. This concentrated metal product contains essentially all of the metals contained in a solar panel, excluding the frame, concentrated into a product that comprises <5% of the mass of the entire panel, greatly simplifying further metal recovery or disposal.

d. Essentially all of the potentially environmentally harmful material (i.e., Pb) is concentrated in this small mass, greatly simplifying disposal and/or beneficial use.

Silver and copper may be subsequently recovered from the electrically conductive material stream by any suitable means known in the art. For example, the silver may be subsequently separated from the copper by a dissolution and selective precipitation process.

The method may be said to relate to the following items.

1. A method of recycling a solar panel, comprising:
        removing a frame from the solar panel;
        delaminating a glass cover, silicon wafers and a plastic backing of the solar panel using a green solvent adapted to weaken, rather than dissolve, an adhesive used in lamination of the solar panel thereby generating a delaminated material stream;
        separating glass of the glass cover from the delaminated material stream;
        separating the plastic backing from the delaminated material stream thereby generating a concentrated metals stream;

electrostatically separating insulator materials and electrically conducting materials from the concentrated metals stream thereby creating an insulator material stream and an electrically conducting material stream; and
        separating silicon from other metals in the electrically conducting material stream.

2. The method of item 1, including recycling the frame.

3. The method of item 2, including recycling the glass.

4. The method of item 1, including subjecting the solar panel to shredding following the removal of the frame and prior to the delaminating.

5. The method of item 4, wherein the separating of the glass is by screening the glass from the delaminated material stream.

6. The method of item 5, further including further shredding the delaminated material stream following the separating of the glass.

7. The method of item 6, wherein the separating of the plastic backing is by screening.

8. The method of item 1, further including recovering copper from the electrically conducting material stream.

9. The method of item 8, further including recovering silver from the electrically conducting material stream.

10. A method of recycling a solar panel, comprising:
        delaminating a glass cover, silicon wafers and a plastic backing of the solar panel using a green solvent adapted to weaken, without fully dissolving, an adhesive used in lamination of the solar panel thereby generating a delaminated material stream;
        separating glass of the glass cover from the delaminated material stream; and
        separating the plastic backing from the delaminated material stream thereby generating a concentrated metals stream.

11. The method of item 10, further including substantially avoiding (1) coating of metal-containing particles in the delaminated material stream, and (2) masking of conductive properties of the metal containing particles with fully dissolved adhesive.

12. The method of item 10, further including electrostatically separating insulator materials and electrically conducting materials from the concentrated metals stream thereby creating an insulator material stream and an electrically conducting material stream.

13. The method of item 12, further including recovering silicon from the other metals in the electrically conducting material stream.

14. The method of item 13, further including recovering silver and copper from the electrically conducting material stream.

15. A method of recycling a solar panel, comprising:
        diffusing a solvent into a polymer adhesive used in lamination of the solar panel to expand the polymer adhesive and thereby generate a delaminated material stream without fully dissolving the polymer adhesive;
        separating glass from the delaminated material stream; and
        separating the plastic backing from the delaminated material stream thereby generating a concentrated metals stream.

16. The method of item 15, further including electrostatically separating insulator materials and electrically conducting materials from the concentrated metals stream thereby creating an insulator material stream and an electrically conducting material stream.

17. The method of item 16, further including recovering silicon from the other metals in the electrically conducting material stream.

18. The method of item 17, further including recovering silver and copper from the electrically conducting material stream.

Each of the following terms written in singular grammatical form: "a", "an", and "the", as used herein, means "at least one", or "one or more". Use of the phrase "One or more" herein does not alter this intended meaning of "a", "an", or "the". Accordingly, the terms "a", "an", and "the", as used herein, may also refer to, and encompass, a plurality of the stated entity or object, unless otherwise specifically defined or stated herein, or, unless the context clearly dictates otherwise. For example, the phrase: "a solar panel", as used herein, may also refer to, and encompass, a plurality of solar panels.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated component(s), feature(s), characteristic(s), parameter(s), integer(s), or step(s), and does not preclude addition of one or more additional component(s), feature(s), characteristic(s), parameter(s), integer(s), step(s), or groups thereof.

The phrase "consisting of", as used herein, is closed-ended and excludes any element, step, or ingredient not specifically mentioned. The phrase "consisting essentially of", as used herein, is a semi-closed term indicating that an item is limited to the components specified and those that do not materially affect the basic and novel characteristic(s) of what is specified.

Terms of approximation, such as the terms about, substantially, approximately, etc., as used herein, refers to ±10% of the stated numerical value.

Although the method of this disclosure have been illustratively described and presented by way of specific exemplary embodiments, and examples thereof, it is evident that many alternatives, modifications, or/and variations, thereof, will be apparent to those skilled in the art. Accordingly, it is intended that all such alternatives, modifications, or/and variations, fall within the spirit of, and are encompassed by, the broad scope of the appended claims.

What is claimed:

1. A method of recycling a solar panel, comprising:
removing a frame from the solar panel;
delaminating a glass cover, silicon wafers and a plastic backing of the solar panel using a green solvent adapted to weaken, rather than dissolve, an adhesive used in lamination of the solar panel thereby generating a delaminated material stream;
separating glass of the glass cover from the delaminated material stream;
separating the plastic backing from the delaminated material stream thereby generating a concentrated metals stream;
electrostatically separating insulator materials and electrically conducting materials from the concentrated metals stream thereby creating an insulator material stream and an electrically conducting material stream; and
separating silicon from other metals in the electrically conducting material stream.

2. The method of claim 1, including recycling the frame.

3. The method of claim 2, including recycling the glass.

4. The method of claim 1, including subjecting the solar panel to shredding following the removal of the frame and prior to the delaminating.

5. The method of claim 4, wherein the separating of the glass is by screening the glass from the delaminated material stream.

6. The method of claim 5, further including further shredding the delaminated material stream following the separating of the glass.

7. The method of claim 6, wherein the separating of the plastic backing is by screening.

8. The method of claim 1, further including recovering copper from the electrically conducting material stream.

9. The method of claim 8, further including recovering silver from the electrically conducting material stream.

10. A method of recycling a solar panel, comprising:
delaminating a glass cover, silicon wafers and a plastic backing of the solar panel using a green solvent adapted to weaken, without fully dissolving, an adhesive used in lamination of the solar panel thereby generating a delaminated material stream;
separating glass of the glass cover from the delaminated material stream; and
separating the plastic backing from the delaminated material stream thereby generating a concentrated metals stream.

11. The method of claim 10, further including substantially avoiding (1) coating of metal-containing particles in the delaminated material stream, and (2) masking of conductive properties of the metal containing particles with fully dissolved adhesive.

12. The method of claim 10, further including electrostatically separating insulator materials and electrically conducting materials from the concentrated metals stream thereby creating an insulator material stream and an electrically conducting material stream.

13. The method of claim 12, further including recovering silicon from the other metals in the electrically conducting material stream.

14. The method of claim 13, further including recovering silver and copper from the electrically conducting material stream.

15. A method of recycling a solar panel, comprising:
diffusing a solvent into a polymer adhesive used in lamination of the solar panel to expand the polymer adhesive and thereby generate a delaminated material stream without fully dissolving the polymer adhesive;
separating glass from the delaminated material stream; and
separating a plastic backing from the delaminated material stream thereby generating a concentrated metals stream.

16. The method of claim 15, further including electrostatically separating insulator materials and electrically conducting materials from the concentrated metals stream thereby creating an insulator material stream and an electrically conducting material stream.

17. The method of claim 16, further including recovering silicon from other metals in the electrically conducting material stream.

18. The method of claim 17, further including recovering silver and copper from the electrically conducting material stream.

* * * * *